United States Patent
Swartz et al.

(10) Patent No.: US 7,859,298 B1
(45) Date of Patent: Dec. 28, 2010

(54) METHOD AND SYSTEM TO FACILITATE CONFIGURABLE INPUT/OUTPUT (I/O) TERMINATION VOLTAGE REFERENCE

(75) Inventors: Ronald W. Swartz, Granite Bay, CA (US); Vladislav Tsirkin, Jerusalem (IL); Ram Livne, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/495,602

(22) Filed: Jun. 30, 2009

(51) Int. Cl.
*H03K 17/16* (2006.01)
*H03K 19/003* (2006.01)
(52) U.S. Cl. .......................... 326/30; 326/86; 365/148
(58) Field of Classification Search .............. 326/27, 326/30, 82, 83, 86; 365/148
See application file for complete search history.

(56) References Cited

U.S. PATENT DOCUMENTS

| 2007/0147106 A1* | 6/2007 | Kyung | 365/148 |
| 2008/0031166 A1* | 2/2008 | Fukuda | 370/297 |

* cited by examiner

*Primary Examiner*—Daniel D Chang
(74) *Attorney, Agent, or Firm*—Blakely, Sokoloff, Taylor & Zafman LLP

(57) ABSTRACT

A method and system to facilitate configurable input/output (I/O) termination voltage reference in a transmitter or receiver. In one embodiment of the invention, the transmitter and receiver, each has a termination circuit to select a suitable termination reference voltage based on the desired coupling type. In one embodiment of the invention, the transmitter has a termination circuit coupled with a transmission driver and the transmitter selects only one of a supply voltage, a ground voltage and a half supply voltage as a termination voltage reference of the transmission driver. The receiver has a termination circuit to select either a supply voltage or a ground voltage as a termination voltage reference of the receiver.

22 Claims, 2 Drawing Sheets

METHOD AND SYSTEM TO FACILITATE CONFIGURABLE INPUT/OUTPUT (I/O) TERMINATION VOLTAGE REFERENCE

FIELD OF THE INVENTION

This invention relates to a termination circuit, and more specifically, but not exclusively, to a configurable input/output (I/O) termination voltage reference.

BACKGROUND DESCRIPTION

A typical computer system has several major components that include the processor, the memory controller hub, commonly known as the "Northbridge", the I/O controller hub, commonly known as the "Southbridge", memory modules, and a mass storage device.

The termination voltage reference of the interface between the Southbridge and the Northbridge is usually fixed. For example, when direct current (DC) coupling between a Southbridge and a Northbridge is to be used, a power supply terminated Southbridge can only connect to a power supply terminated Northbridge. The power supply terminated Southbridge cannot be connected to a ground voltage terminated Northbridge. As such, the fixed termination voltage reference of the Southbridge and Northbridge does not allow the interoperability of the Southbridge and Northbridge.

BRIEF DESCRIPTION OF THE DRAWINGS

The features and advantages of embodiments of the invention will become apparent from the following detailed description of the subject matter in which.

DETAILED DESCRIPTION

Figure 1:
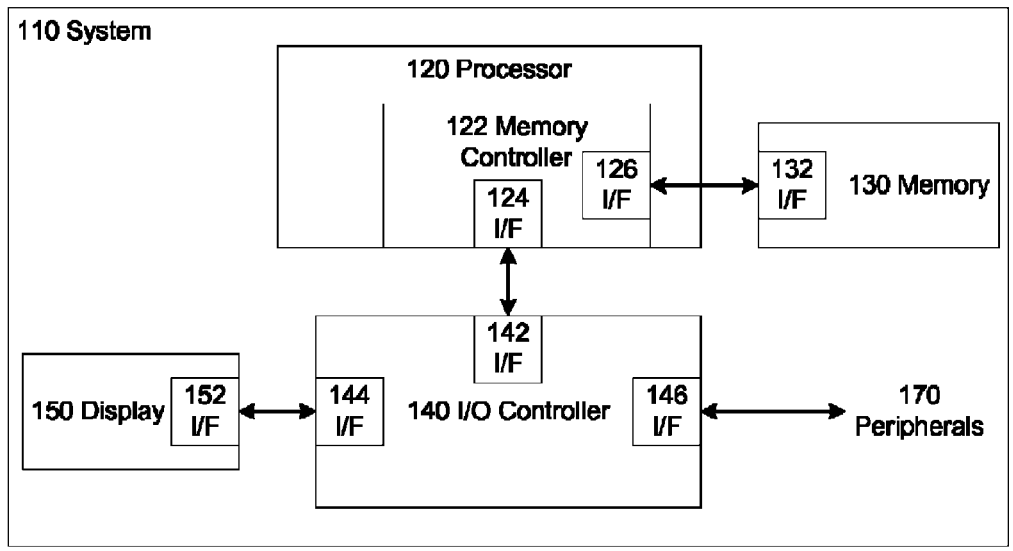
FIG. 1 illustrates a system in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to facilitate configurable input/output (I/O) termination voltage reference in a transmitter or receiver. In one embodiment of the invention, the transmitter and receiver, each has a termination circuit to select a suitable termination reference voltage based on the desired coupling type. For example, in one embodiment of the invention, the transmitter has a termination circuit coupled with a transmission driver and the transmitter selects only one of a supply voltage, a ground voltage and a half supply voltage as a termination voltage reference of the transmission driver. In another embodiment of the invention, the receiver has a termination circuit to select either a supply voltage or a ground voltage as a termination voltage reference of the receiver.

For example, in one embodiment, when AC coupling between the transmitter and the receiver is to be used, the transmitter selects the half supply voltage as the termination voltage reference of the transmission driver and the receiver selects a ground voltage as the termination voltage reference of the receiver. By facilitating configurable I/O termination voltage reference in a transmitter or receiver, it allows interoperability of the transmitter and/or the receiver. In addition, there is no need to have multiple designs of a transmitter with different termination voltage references. A single design of a transmitter with configurable I/O termination voltage references can be used to save costs of maintaining multiple product lines of the transmitter with different termination voltage references.

FIG. 1 illustrates a block diagram 100 of a system 110 in accordance with one embodiment of the invention. The system 110 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 110 used to implement the methods disclosed herein may be a system-on-chip (SOC).

The processor 120 has a processing core to execute instructions of the system 110. The processing core includes, but is not limited to, pre-fetch logic to fetch instructions, decode logic to decode the instructions, execution logic to execute instructions and the like. The processor 120 has a cache memory to cache instructions and/or data of the system 110. In another embodiment of the invention, the cache memory includes, but is not limited to, level one, level two and level three, cache memory or any other configuration of the cache memory within the processor 120.

The processor 120 has a memory controller 122 coupled with an I/O controller 140 via the interfaces 124 and 142. The memory controller 122 performs functions that enable the processor 120 to access and communicate via the interfaces 126 and 132 with a memory 130 that includes a volatile memory and/or a non-volatile memory. The volatile memory includes, but is not limited to, Synchronous Dynamic Random Access Memory (SDRAM), Dynamic Random Access Memory (DRAM), RAMBUS Dynamic Random Access Memory (RDRAM), and/or any other type of random access memory device.

The non-volatile memory includes, but is not limited to, NAND flash memory, phase change memory (PCM), read only memory (ROM), electrically erasable programmable read only memory (EEPROM), or any other type of non-volatile memory device. The memory 130 stores information and instructions to be executed by the processor 120. The memory 130 may also stores temporary variables or other intermediate information while the processor 120 is executing instructions. In another embodiment of the invention, the memory controller 122 is separate from the processor 120 and exists in another block or module.

The I/O controller 140 includes, but is not limited to, an I/O controller hub (ICH), a platform controller hub (PCH), a chipset and the like. The I/O controller 140 enables the processor 120 to connect to other modules in the system 110. In one embodiment of the invention, the interfaces 124 and 142 operate in accordance with, but not limited to, a Point-to-Point communication protocol such as the Intel® QuickPath Interconnect (QPI), a direct media interface (DMI) or the like. The I/O controller 140 connects via the interfaces 144 and 152 to a display device 150 that includes, but is not limited to, liquid crystal display (LCD), cathode ray tube (CRT) display, or any other form of visual display device. In one embodiment of the invention, the interfaces 144 and 152 operate in accordance with, but not limited to, a Digital Visual Interface (DVI) protocol, a DisplayPort protocol, a High-Definition Multimedia Interface (HDMI) and the like.

In one embodiment of the invention, the I/O controller 140 has a configurable transmitter in the interface 142. The I/O controller 140 is able to select a desired termination voltage reference in the interface 142 to communicate with the interface 124 in the memory controller 122. In one of the embodiment of the invention, if the I/O controller 140 and the memory controller 122 are communicating in accordance with DMI, the I/O controller 140 selects only one of a supply voltage of the system 110, a ground voltage of the system 110 and a half supply voltage of the system 110 as the termination voltage reference. The memory controller 122 has a receiver to select a desired termination voltage reference that matches the type of coupling in the transmitter in the interface 142 in one embodiment of the invention.

The configurability of the transmitter in the interface 142 of the I/O controller and of the receiver in the interface 124 of the memory controller 122 facilitates the interoperability of the I/O controller 140 and the memory controller 122 in one embodiment of the invention. The I/O controller 140 has an interface(s) 146 to couple with peripherals including, but not limited to, a non-volatile memory, a storage medium, a keyboard/mouse and a network interface. The storage medium includes, but is not limited to, a solid state drive, a hard disk drive, an universal serial bus flash memory drive, or any other form of computer data storage medium.

The network interface is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the Institute of Electrical and Electronics Engineers (IEEE) wireless standard family 802.11, Home Plug AV (HPAV), Ultra Wide Band (UWB), Bluetooth, WiMax, or any form of wireless communication protocol.

While the modules shown in FIG. 1 are depicted as separate blocks within the system 110, the functions performed by some of these blocks may be integrated within a single semiconductor circuit or may be implemented using two or more separate integrated circuits. The system 110 may include more than one processor/processing core in another embodiment of the invention. In addition, there are other functional blocks or more instances of each block that can be connected in system 110 that are not shown.

Figure 2:
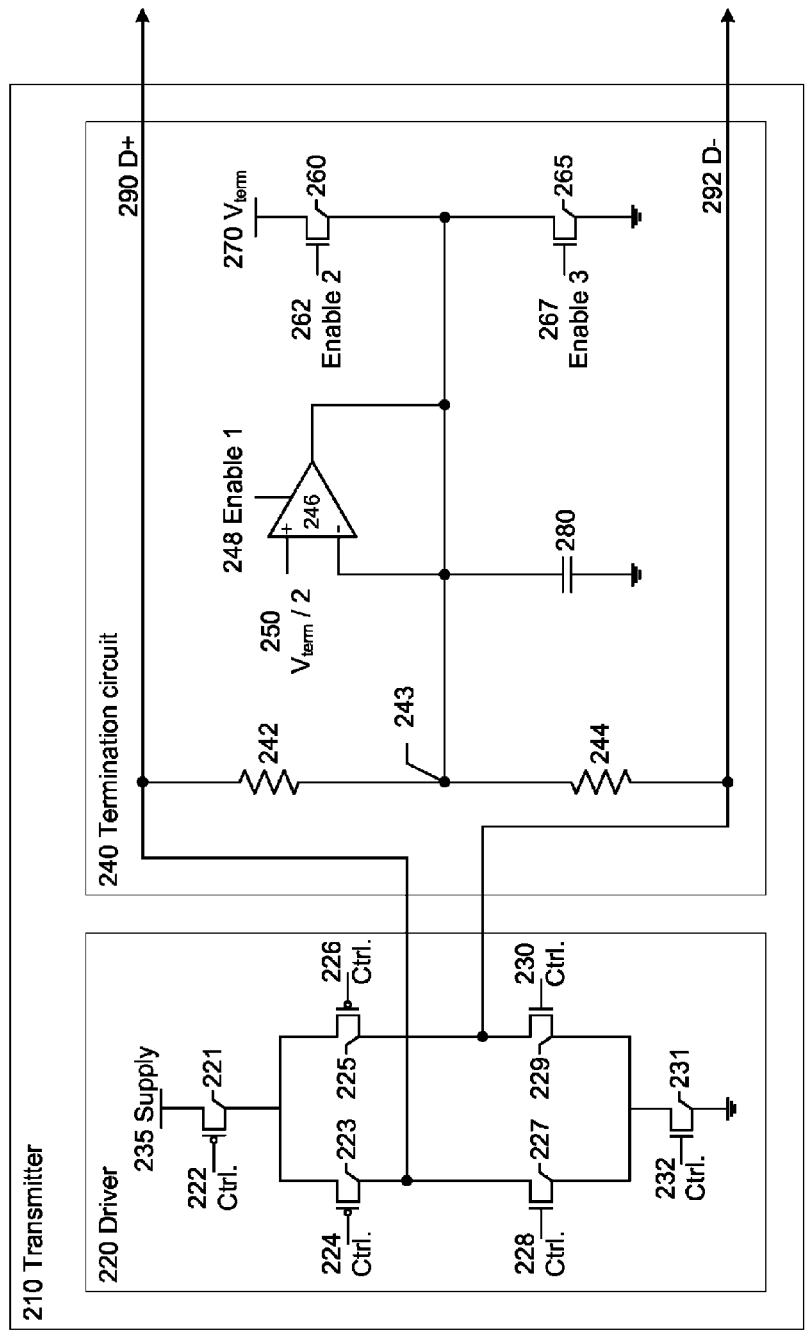
FIG. 2 illustrates a circuit diagram of a transmitter in accordance with one embodiment of the invention.

FIG. 2 illustrates a circuit diagram 200 of a transmitter 210 in accordance with one embodiment of the invention. The transmitter 210 is part of the interface 142 in the I/O controller 140 in one embodiment of the invention. In another part of the invention, the transmitter 210 is part of the interface 144 in the I/O controller 140. One of ordinary skill in the relevant art will readily appreciate that the transmitter 210 can be utilized in any interface of the system 110 without affecting the workings of the invention.

The transmitter has a driver 220 coupled with a termination circuit 240. In one embodiment of the invention, the transmitter transmits information via a pair of differential links D+ 290 and D− 292. The driver 220 has six transistors 221, 223, 225, 227, 229, and 231 that are controlled by control signals 222, 224, 226, 228, 230, and 232 respectively. The supply voltage 235 supplies the power to the driver 220 and one of ordinary skill in the relevant art will readily appreciate the workings of the driver and the workings shall not be described herein. The circuit diagram of the driver 220 illustrated is not meant to be limiting and one of ordinary skill in the relevant art will readily appreciate that other implementations of the driver 220 are possible without affecting the workings of the invention.

The termination circuit 240 has three possible settings for the termination voltage reference in one embodiment of the invention. One of ordinary skill in the relevant art will appreciate that more than three or less than three possible settings of the termination voltage reference can be implemented in other embodiments of the invention.

The termination circuit 240 has two resistors 242 and 244 connected in series across the pair of differential outputs D+ 290 and D− 292 of the driver 220. In one embodiment of the invention, the resistors 242 and 244 have substantial equal value. In another embodiment of the invention, the resistors 242 and 244 each has a value of 50 Ohms. The first setting of the termination voltage reference of the transmitter 210 is facilitated by an operational amplifier (op-amp) 246. The output and inverting input of the op-amp 246 is connected to a node 243 in one embodiment of the invention. The voltage at the node 243 is the termination voltage reference of the transmitter 210. The non-inverting input of the op-amp 246 is connected to a half terminal voltage ($V_{term}/2$) 250, i.e., half of the terminal voltage of the driver 220. In one embodiment of the invention, the terminal voltage is connected to the supply voltage of the transmitter 210.

The op-amp 246 has an enable 1 signal 248 signal to control when the voltage of the node 243 is set to half of the terminal voltage in one embodiment of the invention. For example, in one embodiment of the invention, if the enable 1 signal 248 is asserted, i.e., activated or turned on, the inverting input of the op-amp 246 sees the same voltage as the non-inverting input of the op-amp 246. As the non-inverting input of the op-amp 246 is set to $V_{term}/2$ 250, therefore, the inverting input of the op-amp 246 is set to $V_{term}/2$ 250. The node 243 is set to $V_{term}/2$ 250 by the enabling of the op-amp 246 in one embodiment of the invention. The termination voltage reference of the transmitter 210 is set to $V_{term}/2$ 250 when the enable 1 signal 248 signal is asserted.

The termination circuit 240 has a capacitor 280 that is connected to the node 243 and the ground node. In one embodiment of the invention, the termination voltage reference is set as half of the terminal voltage of the driver 220 when the transmitter 210 is to be set in an alternative current (AC) coupling mode. The capacitor 280 acts as a short circuit to the ground node at high frequencies.

The second setting of the termination voltage reference is facilitated by a switching logic in one embodiment of the invention. The switching logic includes, but is not limited to, a transistor, a relay, and the like. The terminal circuit 240 has a transistor 260 controlled by an enable 2 signal 262 in one embodiment of the invention. When the enable 2 signal 262 is asserted, the transistor 260 is turned or switched on and it allows the node 243 to be set as the terminal voltage ($V_{term}$) 270. The termination voltage reference of the transmitter 210 is therefore set as the terminal voltage ($V_{term}$) 270.

The third setting of the termination voltage reference is facilitated by another switching logic in one embodiment of the invention. The terminal circuit 240 has a transistor 265 controlled by an enable 3 signal 267 in one embodiment of the invention. When the enable 3 signal 267 is asserted, the transistor 265 is turned or switched on and it allows the node 243 to be set as the ground voltage. The termination voltage reference of the transmitter 210 is therefore set as the ground voltage.

In one embodiment of the invention, the transmitter select only the supply voltage or only a ground voltage as the termination voltage reference of the transmitter 210 when the transmitter 210 is to be set in a direct current (DC) coupling mode. During the operation of the transmitter 210, only one of three enable signals 248, 262 and 267 is asserted to select the desired termination voltage reference in one embodiment of the invention.

In one embodiment of the invention, the I/O controller 140 has a register to control the settings of the three enable signals 248, 262 and 267. For example, in one embodiment of the invention, the I/O controller 140 has two bits to control the termination voltage reference of the transmitter 210. Based on the value of the two bits in the register, the appropriate control signals are sent to the three enable signals 248, 262 and 267. For example, when the value of the two bits are set to "00" to indicate a setting of ground voltage as the termination voltage reference of the transmitter 210, a control signal is sent to assert the enable 3 signal 267 and two control signals are each sent to de-assert the enable signals 248 and 262 to deactivate the op-amp 248 and transistor 260 respectively.

In one embodiment of the invention, the register is part of the transmitter 210. One of ordinary skill in the relevant art will readily appreciate that other methods of controlling the enable signals 248, 262 and 267 and these other methods can also be used without affecting the workings of the invention. For example, in another embodiment of the invention, the enable signals 248, 262 and 267 are each connected to a strap pin on a system board to allow the configuration of the termination voltage reference of the I/O controller 140. The user may, for example, use a jumper to connect the desired strap pin to the supply voltage or to the ground voltage.

Figure 3:
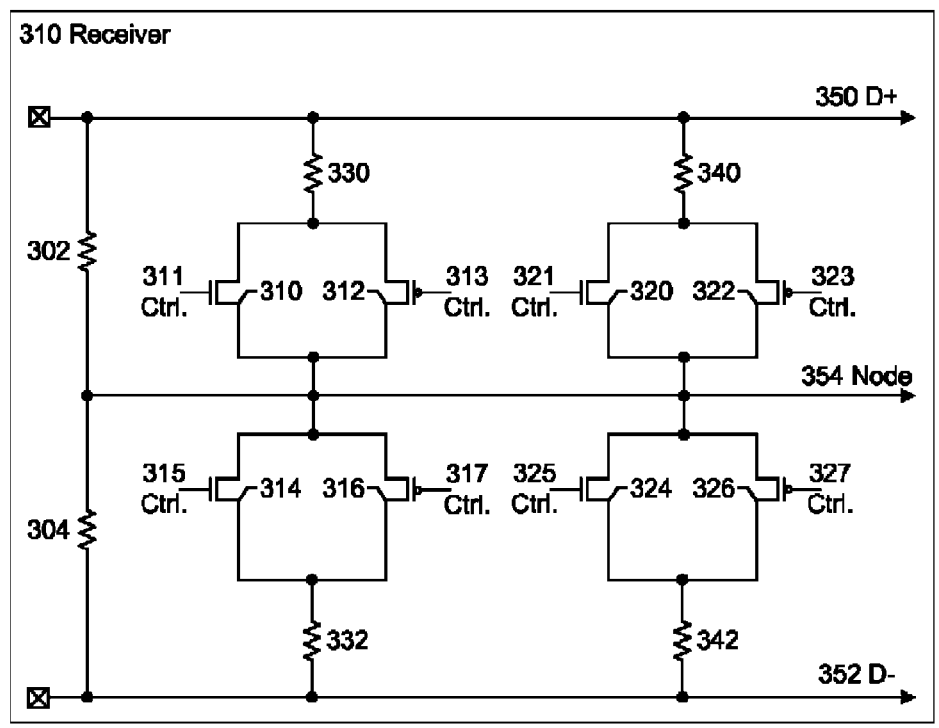
FIG. 3 illustrates a circuit diagram of a receiver in accordance with one embodiment of the invention.

FIG. 3 illustrates a circuit diagram 300 of a receiver 310 in accordance with one embodiment of the invention. In one embodiment of the invention, the receiver 310 is part of the interface 124 in the memory controller 122. In other embodiments of the invention, the receiver 310 may also be implemented in other interfaces of the system 110. The receiver 310 has a pair of differential input signals D+ 350 and D− 352. The resistors 302 and 304 are connected in series across the pair of differential input signals D+ 350 and D− 352. In one embodiment of the invention, the resistors 302 and 304 have substantially equal value. In another embodiment of the invention, the resistors 302 and 304 have a value of 50 Ohms when the receiver 310 is operable in accordance with DMI protocol.

One of ordinary skill in the relevant art will readily appreciate the workings of the circuit in the receiver 310 and the workings shall not be described herein. The node 354 is available as a pin or ball on a package of the receiver 310 in one embodiment of the invention. The node 354 can be connected to a strap pin on a system board in one embodiment of the invention. This allows the termination voltage reference of the receiver 310 to be controlled via the strap pin by connecting a supply voltage or ground voltage. In another embodiment of the invention, the node 354 is controllable or configurable by a register. For example, in one embodiment of the invention, one bit of the register can be used to control the voltage of the node 354.

With configurable or controller termination voltage reference of the transmitter 210 and/or receiver 310, interoperability of the transmitter 210 and/or receiver 310 can be achieved.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. The term "substantially equal" used herein means that the difference in the value does not differ more 10%. For example, a resistor may have a tolerance level of 5% and two resistors having an equal published resistance value may differ in the actual measured resistance value due to the tolerance level. The tolerance level is acceptable within a range of 10% in one embodiment of the invention. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
a transmission driver; and
a termination circuit coupled with the transmission driver to select only one of a supply voltage, a ground voltage and a half supply voltage as a termination voltage reference of the transmission driver, wherein the termination circuit has three control signals, and wherein each control signal is to enable or disable a respective one of the supply voltage, the ground voltage and the half supply voltage as the termination voltage reference of the transmission driver.

2. The apparatus of claim 1, wherein the termination circuit to select only one of the supply voltage, the ground voltage and the half supply voltage as the termination voltage reference of the transmission driver is to assert only one of the three control signals to enable the respective one of the supply voltage, the ground voltage and the half supply voltage as the termination voltage reference of the transmission driver.

3. The apparatus of claim 2, wherein the transmission driver is to drive a pair of differential output signals; and wherein the termination circuit comprises:
 a resistor coupled with one of the differential output signals and a node;
 another resistor coupled with another of the differential output signals and the node;
 a capacitor coupled with the node and a ground node; and
 an operational amplifier having a non-inverted input, an inverted input, an enable input and an output, wherein the non-inverted input is coupled with the half supply voltage, wherein the inverted input and the output are coupled with the node, and wherein only a first of the three control signals is coupled with the enable input, to set the node to the half supply voltage responsive to an assertion of the first control signal.

4. The apparatus of claim 3, wherein the termination circuit further comprises:
 switching logic having a switch input, a switch output and another enable input, wherein the switch input is coupled to the supply voltage, wherein the switch output is coupled with the node and wherein only a second of the three control signals is coupled with the other enable input, to set the node to the supply voltage responsive to an assertion of the second control signal.

5. The apparatus of claim 4, wherein the enable input is a first enable input, wherein the other enable input is a second enable input, and wherein the termination circuit further comprises:
 another switching logic having another switch input, another switch output and a third enable input, wherein the other switch input is coupled to the ground node, wherein the other switch output is coupled with the node and wherein only a third of the three control signals is coupled with the third enable input, to set the node to the ground voltage responsive to an assertion of the third control signal.

6. The apparatus of claim 1, wherein the termination circuit to select only one of the supply voltage, the ground voltage and the half supply voltage as the termination voltage reference of the transmission driver is to select only the half supply voltage as the termination voltage reference of the transmission driver when the transmission driver is to be set in an alternative current (AC) coupling mode.

7. The apparatus of claim 1, wherein the termination circuit to select only one of the supply voltage, the ground voltage and the half supply voltage as the termination voltage reference of the transmission driver is to select only the supply voltage or only a ground voltage as the termination voltage reference of the transmission driver when the transmission driver is to be set in a direct current (DC) coupling mode.

8. The apparatus of claim 1, wherein the apparatus comprises a register having one or more bits to program the three control signals.

9. The apparatus of claim 1, wherein the transmission driver is operable in accordance with one of a Direct Media Interface (DMI) protocol, a Peripheral Component Interconnect (PCI) Express interface protocol, and a display port interface protocol.

10. A system comprising:
 a memory controller having a receiver with a termination circuit to select either a supply voltage or a ground voltage as a termination voltage reference of the receiver, wherein the receiver comprises a pair of differential input signals coupled to the termination circuit, and wherein the termination circuit comprises:
  a resistor coupled with one of the differential input signals and a node; and
  another resistor coupled with another of the differential input signals and the node; and wherein the receiver is further to connect the node to the selected voltage; and
 a controller having a transmitter to communicate with the receiver.

11. The system of claim 10, wherein the memory controller is a memory controller hub (MCH) and wherein the controller is one of a platform controller hub (PCH) and input/output (I/O) controller hub (ICH).

12. The system of claim 11, further comprising a processor, wherein the MCH is a part of the processor.

13. The system of claim 10, wherein the termination circuit is a receiver termination circuit, wherein the termination voltage reference is a receiver termination voltage reference, wherein the supply voltage is a receiver supply voltage, and wherein the transmitter comprises:
 a transmission driver; and
 a transmitter termination circuit coupled with the transmission driver to select only one of a transmitter supply voltage, a ground voltage and a half supply voltage as a transmitter termination voltage reference of the transmission driver.

14. The system of claim 13, wherein the transmitter termination circuit has three control signals, and wherein each control signal is to enable or disable a respective one of the transmitter supply voltage, the ground voltage and the half supply voltage as the transmitter termination voltage reference of the transmission driver.

15. The system of claim 13, wherein the transmitter termination circuit to select only one of the transmitter supply voltage, the ground voltage and the half supply voltage as the termination voltage reference of the transmission driver is to assert only one of the three control signals to enable the respective one of the transmitter supply voltage, the ground voltage and the half supply voltage as the termination voltage reference of the transmission driver.

16. The system of claim 15, wherein the transmission driver is to drive a pair differential output signals; and wherein the termination circuit comprises:
 a resistor coupled with one of the differential output signals and another node;
 another resistor coupled with another of the differential output signals and the node;
 a capacitor coupled with the node and a ground node; and
 an operational amplifier having a non-inverted input, an inverted input, an enable input and an output, wherein the non-inverted input is coupled with the half supply voltage, wherein the inverted input and the output are coupled with the node, and wherein only a first of the three control signals is coupled with the enable input, to set the node to the half supply voltage responsive to an assertion of the first control signal.

17. The system of claim 16, wherein the transmitter termination circuit further comprises:
 switching logic having a switch input, a switch output and another enable input, wherein the switch input is coupled to the transmitter supply voltage, wherein the switch output is coupled with the node and wherein only a second of the three control signals is coupled with the other enable input, to set the node to the transmitter supply voltage responsive to an assertion of the second control signal.

18. The system of claim 17, wherein the enable input is a first enable input, wherein the other enable input is a second enable input, and wherein the transmitter termination circuit further comprises:

another switching logic having another switch input, another switch output and a third enable input, wherein the other switch input is coupled to the ground node, wherein the other switch output is coupled with the node and wherein only a third of the three control signals is coupled with the third enable input, to set the node to the ground voltage responsive to an assertion of the third control signal.

19. The system of claim 13, wherein the transmission driver is operable in accordance with one of a Direct Media Interface (DMI) protocol, a Peripheral Component Interconnect (PCI) Express interface protocol, and a display port interface protocol.

20. A method comprising:

selecting by a termination circuit coupled with a transmission driver, only one of a supply voltage, a ground voltage and a half supply voltage as a termination voltage reference of the transmission driver, wherein the termination circuit has three control signals, and wherein each control signal is to enable or disable a respective one of the supply voltage, the ground voltage and the half supply voltage as the termination voltage reference of the transmission driver.

21. The method of claim 20, further comprising selecting either another supply voltage or another ground voltage as a termination voltage reference of a receiver communicatively coupled with the transmitter.

22. The method of claim 21, wherein the transmitter and the receiver are communicatively coupled in accordance with one of a Direct Media Interface (DMI) protocol, a Peripheral Component Interconnect (PCI) Express interface protocol, and a display port interface protocol.

* * * * *